United States Patent
Cho et al.

(10) Patent No.: US 8,635,704 B2
(45) Date of Patent: *Jan. 21, 2014

(54) DIGITAL DATA FILE MANAGEMENT METHOD AND RECORDING MEDIUM FOR RECORDING DIGITAL DATA FILE MANAGEMENT PROGRAM THEREON

(75) Inventors: Young-Soon Cho, Pyungtaek (KR); Jae-Young Kim, Seoul (KR); Han Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 1653 days.

This patent is subject to a terminal disclaimer.

(21) Appl. No.: 11/373,248

(22) Filed: Mar. 13, 2006

(65) Prior Publication Data

US 2006/0174321 A1    Aug. 3, 2006

Related U.S. Application Data

(63) Continuation of application No. 09/500,573, filed on Feb. 10, 2000, now Pat. No. 7,039,944.

(30) Foreign Application Priority Data

Feb. 10, 1999    (KR) .................................. 1999-4560

(51) Int. Cl.
    *H04L 29/06*    (2006.01)

(52) U.S. Cl.
    USPC .............................................. 726/26; 726/31

(58) Field of Classification Search
    USPC ....... 726/26, 31–32; 326/8; 380/236; 705/56;
    725/133; 369/47.1, 47.12, 47.27
    See application file for complete search history.

(56) References Cited

U.S. PATENT DOCUMENTS

| 4,528,643 | A | * | 7/1985 | Freeny, Jr. ...................... 705/52 |
| 5,579,120 | A | | 11/1996 | Oguro et al. |
| 5,778,071 | A | | 7/1998 | Caputo et al. |
| 5,893,911 | A | * | 4/1999 | Piskiel et al. ................. 707/694 |
| 5,933,498 | A | | 8/1999 | Schneck et al. |
| 5,948,136 | A | * | 9/1999 | Smyers ......................... 710/107 |
| 5,982,506 | A | | 11/1999 | Kara |
| 5,987,126 | A | * | 11/1999 | Okuyama et al. ............. 380/203 |
| 6,002,772 | A | | 12/1999 | Saito |
| 6,081,598 | A | * | 6/2000 | Dai ................................. 380/28 |
| 6,236,971 | B1 | | 5/2001 | Stefik et al. |
| 6,301,660 | B1 | | 10/2001 | Benson |
| 6,424,715 | B1 | * | 7/2002 | Saito ............................ 380/201 |
| 6,542,610 | B2 | | 4/2003 | Traw et al. |
| 6,574,609 | B1 | * | 6/2003 | Downs et al. ................... 705/50 |
| 6,577,735 | B1 | | 6/2003 | Bharat |
| 6,741,991 | B2 | | 5/2004 | Saito |
| 6,775,779 | B1 | | 8/2004 | England et al. |

(Continued)

FOREIGN PATENT DOCUMENTS

| CN | 1179254 A | 4/1998 |
| EP | 0715247 A1 | 5/1996 |

(Continued)

*Primary Examiner* — Joseph P. Hirl
*Assistant Examiner* — Chi Nguy
(74) *Attorney, Agent, or Firm* — Birch, Stewart, Kolasch & Birch, LLP

(57) ABSTRACT

The digital data file management method reads a header of the digital data file stored on an external medium. Based on the read header, the digital data file is selectively uploaded and/or managed.

14 Claims, 2 Drawing Sheets

(56) References Cited

U.S. PATENT DOCUMENTS

| | | |
|---|---|---|
| 6,892,306 B1 | 5/2005 | En-Seung et al. |
| 7,039,944 B1 | 5/2006 | Cho et al. |
| 7,159,126 B2 | 1/2007 | Kang et al. |
| 2001/0003553 A1* | 6/2001 | Sako et al. ............ 386/94 |
| 2002/0077988 A1 | 6/2002 | Sasaki et al. |
| 2006/0174321 A1 | 8/2006 | Cho et al. |

FOREIGN PATENT DOCUMENTS

| | | |
|---|---|---|
| JP | 4-48470 A | 2/1992 |
| JP | 5-258463 A | 10/1993 |
| JP | 5-266586 A | 10/1993 |
| JP | 7-30855 A | 1/1995 |
| JP | 9-160899 A | 6/1997 |
| JP | 10-40639 A | 2/1998 |
| JP | 10-108148 A1 | 4/1998 |
| JP | 10-134507 A | 5/1998 |
| JP | 10-269144 A | 10/1998 |
| JP | 10-290246 A | 10/1998 |
| JP | 10-302447 A | 11/1998 |
| JP | 2000-242567 A | 9/2000 |
| WO | WO-96/24231 A | 8/1996 |

* cited by examiner

HEADER

DIGITAL DATA FILE MANAGEMENT METHOD AND RECORDING MEDIUM FOR RECORDING DIGITAL DATA FILE MANAGEMENT PROGRAM THEREON

This application is a Continuation of application Ser. No. 09/500,573, filed on Feb. 10, 2000 now U.S. Pat. No. 7,039,944, the entire contents of which are hereby incorporated by reference and for which priority is claimed under 35 U.S.C. §120.

BACKGROUND OF THE INVENTION

1. Field of the Invention

The present invention relates in general to a method for managing digital data files, such as a digital audio data file and a digital video data file, and a recording medium including a program for performing such management.

2. Description of the Prior Art

Generally, an MP3 player is a type of digital data player for processing digital data files. The MP3 player is new notional, portable digital audio equipment capable of readily downloading and reproducing desired music from a computer communication network using an audio data compression coding technique prescribed in MPEG1 Layer 3. In particular, the MP3 player has few faults and excellent sound quality because it stores music in the form of an MP3 file. Further, the MP3 player is small in size and light in weight, thereby allowing high activity uses such as being carried during physical exercise. For these reasons, this product is being touted as an alternative to a portable cassette tape recorder and compact disk (CD) player.

For use in such an MP3 player, a digital data file is downloaded from a file supplier (server) to a personal computer terminal via a communication network such as the Internet and, in turn, to the MP3 player. The digital data file downloaded as mentioned above may be uploaded from the MP3 player to the personal computer terminal, thereby causing a problem in regard to copyright infringement.

On the other hand, when the supply of digital data players, like the MP3 player, become more widely spread and issues such a copyright protection are settled between digital data file suppliers and copyright holders, digital data file purchasing routes will be extended to vending machines, encoders, etc. In this case, file uploading from a digital data player to, for example, a personal computer terminal will have to be permitted at least under certain restrictions.

However, there is no conventional technique capable of, when a digital data file is intended to be uploaded from the digital data player to the personal computer terminal, identifying a provider of the digital data file and permitting the uploading within limits in accordance with the identified result. This fact becomes an obstacle to the proliferation of the digital data player.

SUMMARY OF THE INVENTION

Therefore, the present invention has been made in view of the above problems and it is an object of the present invention to provide a method for managing a digital audio data file such as MP3 and a digital video data file such as JPEG and a recording medium including a program for such management.

These and other objects are achieved by providing a method for managing a digital data file, comprising reading a header of a digital data file stored by an external device and controlling whether to upload said digital data file based on said read header.

These and other objects are further achieved by providing a program (or script) embodied on a computer-readable medium for managing a digital data file, said computer readable medium comprising a first program code segment to read a header of a digital data file stored by an external device; and a second program code segment to control whether to upload said digital data file based on said read header.

These and other objects are still further achieved by providing a computer data signal comprising a first signal segment to read a header of a digital data file stored by an external device, and a second signal segment to control whether to upload said digital data file based on said read header.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 1:
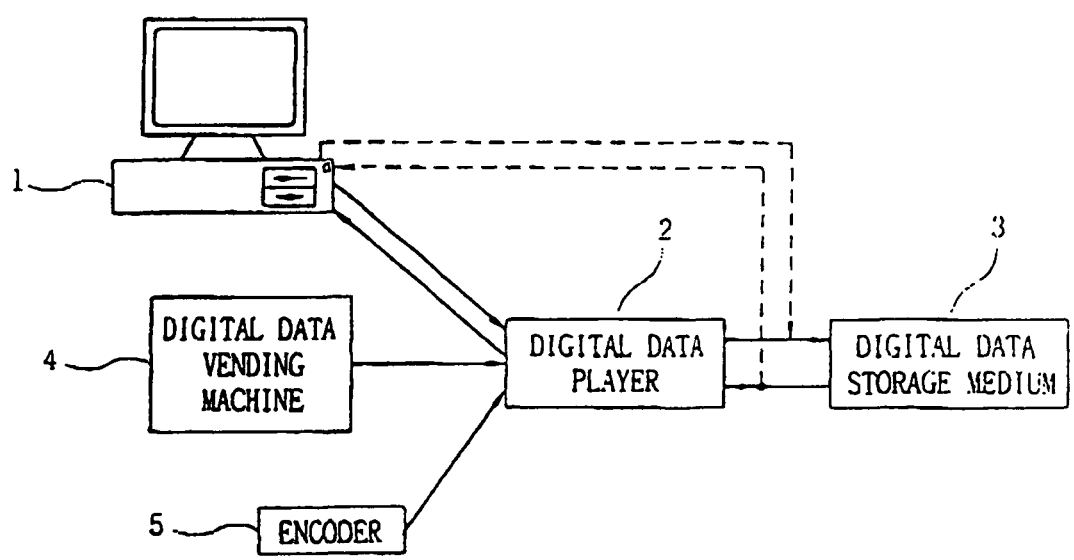
FIG. 1 is a block diagram illustrating the movement of digital data files from/to a digital data player.
Figure 2A:
FIG. 2 is a view illustrating identification codes of digital data files in accordance with the present invention.
Figure 2B:
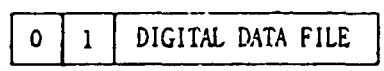
Figure 2C:
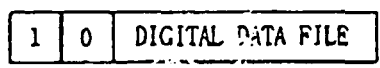
Figure 2D:
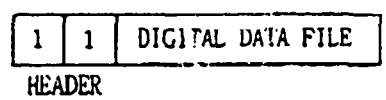

FIG. 1 is a block diagram illustrating the movement of digital data files from/to a digital data player, which is provided for the description of a digital data file duplication prevention method according to the present invention. A personal computer terminal 1 is connected to a communication network (not shown) such as the Internet for downloading a digital data file, which is supplied at a charge or free of charge. The personal computer terminal 1 stores the downloaded digital data file on a hard disk therein and reproduces the stored digital data file or downloads it to a digital data player 2. When the digital data player 2 intends to upload its digital data file, the personal computer terminal 1 checks an identification (ID) code in a header of the digital data file and permits the uploading within restrictions in accordance with the checked result. The digital data player 2 stores the digital data file downloaded from the personal computer terminal 1 in a digital data storage medium 3 and reproduces the stored digital data file. Also, the digital data player 2 reproduces an output digital data file received from a digital data vending machine 4 or an encoder 5, or the digital data player 2 uploads the received digital data file to the personal computer terminal 1.

The digital data storage medium 3 is made in a removable form and stores the digital data file from the digital data player 2 therein. Alternatively, as shown by dashed lines, the digital data file is directly downloaded to the digital data storage medium 3, or, within the restrictions associated with the header, is directly uploaded from the digital data storage medium 3 to the personal computer terminal 1.

The digital data vending machine 4 is connected to a communication network such as the Internet and is installed at a roadside or a public place where many people pass, for selling digital data files at a charge. The encoder 5 downloads a digital data file transmitted over a specific transmission line and supplies the downloaded digital data file to the digital data player 2. As with the personal computer terminal 1, digital data files could be directly downloaded from the digital data vending machine 4 or the encoder 5 to the digital data storage medium 3 (not shown).

Now, a detailed description will be given of the digital data file duplication prevention method according to the present invention with reference to FIGS. 1 and 2.

Firstly, the user has to register with a digital data file supplier in order to receive a digital data file from a digital data server (not shown). For user registration, the user is assigned an ID number and password from the digital data file supplier. Then, the user downloads a digital data software player in a software form from the digital data server through the communication network and sets the downloaded digital data software player as a digital data software player in the personal computer terminal 1. Thereafter, in order to download a desired digital data file from the digital data server through the personal computer terminal 1 and communication network, the user may have to pay a corresponding charge to the digital data file supplier and transmits his ID number and password to the digital data server through the personal computer terminal 1 and communication network. The digital data server identifies the user on the basis of the transmitted ID number and password, and supplies the desired digital data file to the user in accordance with the identified result. At this time, the digital data server appends an ID code "01" to a header of the desired digital data file to inhibit that file from being uploaded, and transmits the resultant digital data file to the personal computer terminal 1.

The personal computer terminal 1 stores the digital data file transmitted from the digital data server on the hard disk therein. Under this condition, upon receiving a reproduction request from the user, the personal computer terminal 1 decrypts and reproduces the stored digital data file through the digital data software player. As a result, the user is able to listen to the desired music when the digital data file is an audio file such as an MP3 file and/or view the video when the digital data file is a video file such as a JPEG file at any time through the personal computer terminal 1.

If the user intends to reproduce (listen and/or view) the digital data file purchased along the above path using the digital data player 2, then the personal computer terminal 1 downloads the purchased digital data file to the digital data player 2. Then, the digital data player 2 stores the downloaded digital data file in the digital data storage medium 3, which is preferably made in the form of a removable memory card. If the user requests the digital data player 2 to reproduce the digital data stored in the digital data storage medium 3, then the digital data player 2 reads the stored digital data file from the storage medium 3 and reproduces it through a decoder therein. As a result, the user can listen and/or view the digital data file anywhere using the digital data player 2. On the other hand, in the case where a user tries to load a digital data file received along the above path, but via a different personal computer, to the personal computer terminal 1 or to upload it through the digital data player 2, the personal computer terminal 1 identifies the digital data file on the basis of the ID code "01" and thus inhibits it from being loaded or uploaded.

Secondly, an ID code "00" is assigned to a header of a digital data file which is distributed without restriction (e.g., free of charge) to the personal computer terminal 1 on the communication network. If the user receives such a digital data file through the personal computer terminal 1, he can reproduce the received file freely through the personal computer terminal 1 or digital data player 2 as stated previously. Namely, when the user tries to upload the unrestricted digital data file from the digital data player 2 to the personal computer terminal 1, the personal computer terminal 1 identifies the digital data file as unrestricted on the basis of the ID code "00", and thus permits that file to be uploaded without restriction.

Thirdly, an ID code "10" is assigned to a header of a digital data file which is distributed with limited restrictions (e.g., at a charge from the digital data vending machine 4 installed on a city roadside or a public place where many people pass). For example, in a preferred embodiment, limited restriction digital data may be uploaded once. If the user receives such a limited restriction digital data file and tries to upload the limited restriction digital data file from the digital data player 2 to the personal computer terminal 1, the personal computer terminal 1 determines on the basis of the ID code "10" that the digital data file has limited restrictions (e.g., was sold from the digital data vending machine 4) and permits that file to be uploaded only once. After permitting such uploading, the personal computer terminal 1 changes the ID code from "10" to "01" to inhibit further uploading. As a result, the user is able to upload the limited restriction digital data file only once to the personal computer terminal 1.

Fourthly, an ID code "11" is assigned to a header of a digital data file transmitted through a particular means, such as the encoder 5, and purchased under a desired contract with a supplier. In the case where the user downloads the digital data file through the encoder 5 and tries to upload the downloaded digital data file from the digital data player 2 to the personal computer terminal 1, the personal computer terminal 1 determines on the basis of the ID code "11" that the downloaded digital data file was transmitted through the encoder 5 and thus permits that file to be uploaded with no restriction.

While being described as resident at the personal computer terminal 1, the method according to the present invention is, in a further embodiment, initially stored as a program on a recording medium such as a magnetic or optical disk. This program is then uploaded to the personal computer terminal 1. Alternatively, this program forms part of the digital data player 2 transmitted to the personal computer terminal 1.

As apparent from the above description, according to the present invention, the digital data file is assigned with a code capable of identifying a provider. For example, when the digital data file is purchased at a charge and intended to be uploaded from the digital data player, it can be permitted to be uploaded under certain restrictions according to its code value. Therefore, the digital data file can be prevented from being illegally duplicated.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for a transmission of a digital data file being performed by an electronic device, the method comprising:
receiving the digital data file from a source device, wherein code information is attached to the digital data file by a digital data file provider, the code information identifying the source device;
obtaining a signal for requesting the transmission of the digital data file to an external device; and
determining a restriction of the transmission of the digital data file based on the code information,
wherein the code information indicates a predetermined code value based on a type of the source device, wherein the digital data file is decrypted and reproduced by a software program, the software program being provided by the digital data file provider, and wherein if the code information indicates a first source device, the transmission of the digital data file to the external device is permitted without a restriction, if the code information indicates a second source device, the transmission of the digital data file to the external device is permitted a specific number of times, and if the code information indicates a third source device, the transmission of the digital data file to the external device is restricted.

2. The method of claim 1, further comprising:
updating the code information of the transmitted digital data file according to the transmission of the digital data file to the external device.

3. The method of claim 1, wherein the transmission is classified into one of uploading, loading and downloading.

4. The method of claim 1, wherein the source device includes at least one of a PC, an internet server, an encoder and a digital data vending machine.

5. The method of claim 1, wherein the external device includes at least one of a PC and a mobile digital player.

6. The method of claim 1, wherein the code information is included in a header.

7. The method of claim 1, wherein if the code information indicates a source device being permitted for transmitting a specific number of times, the code information is changed to other code information which inhibits further transmission, after transmitting the digital data file the specific number of times.

8. An electronic device configured to reproduce a digital data file, the electronic device comprising:
a communication module configured to receive/transmit the digital data file;
a controller configured to:
receive, via the communication module, the digital data file from a source device, wherein code information is attached to the digital data file, the code information identifying the source device,
obtain a signal for requesting the transmission of the digital data file to an external device, and
determine a restriction of the transmission of the digital data file based on the code information, wherein the code information indicates a predetermined code value based on a type of the source device, wherein the digital data file is decrypted and reproduced by a software program, the software program provided by the digital data file provider, and wherein if the code information indicates a first source device, the transmission of the digital data file to the external device is permitted without a restriction, if the code information indicates a second source device, the transmission of the digital data file to the external device is permitted a specific number of times, and if the code information indicates a third source device, the transmission of the digital data file to the external device is restricted.

9. The electronic device of claim 8, wherein the controller is further configured to:
update the code information of the transmitted digital data file according to the transmission of the digital data file to the external device.

10. The electronic device of claim 8, wherein the transmission is classified into one of uploading, loading and downloading.

11. The electronic device of claim 8, wherein the source device includes at least one of a PC, an internet server, an encoder and a digital data vending machine.

12. The electronic device of claim 8, wherein the external device includes at least one of a PC and a mobile digital player.

13. The electronic device of claim 8, wherein the code information is included in a header.

14. The electronic device of claim 8, wherein if the code information indicates a source device being permitted for transmitting a specific number of times, the code information is changed to other code information which inhibits further transmission, after transmitting the digital data file the specific number of times.

* * * * *